J. H. REED.
CREAM SEPARATING DEVICE.
APPLICATION FILED JULY 10, 1908.
899,804.
Patented Sept. 29, 1908.
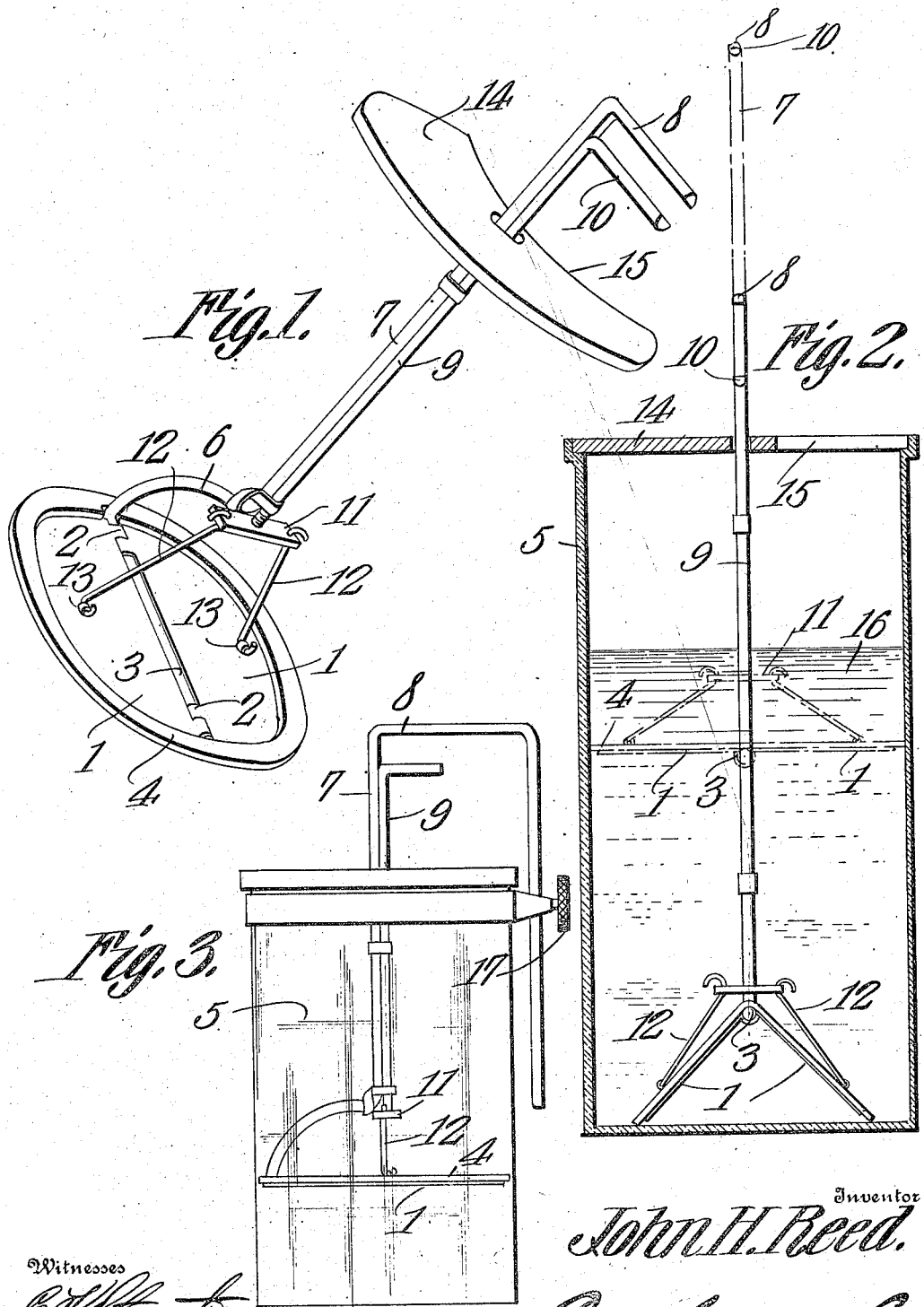
Witnesses
Mason B. Lawton.
Inventor
John H. Reed.
By C. A. Snow & Co.
Attorneys

UNITED STATES PATENT OFFICE.

JOHN H. REED, OF LANCASTER, WISCONSIN.

CREAM-SEPARATING DEVICE.

No. 899,804.

Specification of Letters Patent.

Patented Sept. 29, 1908.

Application filed July 10, 1908. Serial No. 442,940.

*To all whom it may concern:*

Be it known that I, JOHN H. REED, a citizen of the United States, residing at Lancaster, in the county of Grant and State of Wisconsin, have invented a new and useful Cream-Separating Device, of which the following is a specification.

This invention relates to cream separating devices.

The objects of the invention are, the provision in a merchantable form of a cream separating device which may be drawn up beneath the cream after it has collected upon the milk, permitting the cream to be poured from the milk in a separate and distinct mass.

A device of the class described should be inexpensive to manufacture, facile in operation and devoid of complicated parts; it should be capable of manipulation without intermingling the milk and the cream which has collected; and these ends are sought to be effected in my invention.

With these objects in view, together with others which a perusal of this specification will reveal to those skilled in the art, the invention consists in the novel construction and arrangement of parts hereinafter described, delineated in the accompanying drawings and particularly pointed out in the appended claims, it being understood that various changes in the form, proportions, size and minor details of the structure may be made without departing from the spirit or sacrificing any of the advantages of the invention.

Similar numerals of reference are employed to indicate corresponding parts throughout the several figures of the drawings.

In the accompanying drawings, Figure 1 shows in perspective, the cream separating device and the receptacle cover; Fig. 2 is a vertical section through the diameter of the milk receptacle, showing two positions of the wings 1; Fig. 3 is an elevation of a modified form of my invention.

My invention is intended to be used in connection with a milk receptacle 5 which may be of any shape; it is shown in the common cylindrical form and I shall describe my invention as adapted for use in cylindrical vessels, although another form might be employed in particular instances.
As thus constructed, my cream separating device consists of a circular plate, bisected diametrically into the wings 1. Upon their straight inner edges, the wings 1 are pivotally mounted upon the transverse axle 3 and adapted to be rocked upward and downward upon said axle. The mode of attaching the wings 1 to the axle 3 may be varied through all of the common methods of the art adapted to promote a union of the sort shown and described.

In practice I have found it convenient to fashion the wings 1 from metallic sheets, providing strips 2, projecting from the straight inner edges and adapted to be wrapped about the axle 3, the said strips 2 being integral with the wings 1, or soldered or riveted thereto. The periphery of the wings 1 should be resilient in order to form a milk-tight joint between the periphery of the wings 1 and the inner surface of the receptacle 5. To effect this end, a resilient ring 4 may be attached to the wings 1, and permitted to project laterally to engage the inner surface of the receptacle 5 as aforesaid. The device may be lowered and raised by means of the guide-rod 7 which should be terminally connected with the axle 3. As shown, the guide-rod 7 may be integral with the axle 3 and in this case, one end of the axle 3 is bent inwardly upon itself as shown at 6, and then flexed vertically upward to form the guide-rod 7. Into the upper end of the guide-rod 7 may be bent a hand-hold 8. It is advantageous to have the guide-rod 7 rise vertically above the center of the circle formed by the periphery of the wings 1, and I have shown it so disposed.

My invention should include means for rocking the wings 1 upwardly and downward upon the axle 3 and to this end, I have provided the operating-rod 9, terminating at its upper end in the hand-hold 10, similar in shape to the hand-hold 8 and adapted to be grasped simultaneously therewith. The operating-rod 9 is slidably mounted upon the guide-rod 7 and terminates at its lower end in means adapted to form an operative connection between the rod 9 and the wings 1. In the embodiment of my invention selected as the subject of illustration, I have attached to the bottom of the operating-rod 9, the cross-head 11. The cross-head 11 is connected with the upper surface of the wings 1 by the inflexible members 12, having their ends pivotally mounted in the cross-head 11 and the wings 1. The ends of the cross-head 11 may be pierced and rings 13 mounted upon the upper surface of the wings 1, to form attaching points for the inflexible members 12. If desired a cover 14 may be provided, centrally pierced to serve as a guide for the rod 7, an excision 15 furnishing a means for pouring the cream 16 above the wings 1, from the receptacle 5.

In the modified form shown in Fig. 3, the guide-rod is attached to the receptacle 5. The attachment may be rigid, or, as shown, adjustable, any well-known means adapted to the required end being selected. In the form chosen, the thumb-screw 17 furnishes the means for adjustment.

It will be seen that in both forms, the guide-rod 7 is attached, through the member 6 and the axle 3, to the inner edges of the wings 1, and that this construction, together with the method employed for connecting the operating-rod 9 with the wings 1, serves to distribute the strain upon the wings 1, when the latter are rocked upon the axle 3, or moved bodily upward or downward.

In practical operation the hand-holds 8 and 10 are separated vertically, the operating-rod 9 forced downward, and the wings, rocked downward upon the axle 3. The wings 1 are then inserted in the receptacle 5 and lowered to the bottom of the receptacle, their positions relative to each other being unchanged. Milk is then poured into the receptacle 5 and the cover 14 seated in its place. When the cream 16 has risen upon the milk, the device is gently raised by the hand-hold 8, until the wings 1 are directly beneath the cream. The hand-hold 10 is then grasped, the operating-rod 9 drawn upward, the wings 1 rocked upward and their periphery brought into close, milk-tight contact with the inner surface of the milk receptacle 5. The receptacle 5 may then be tilted and the cream permitted to flow out through the excision 15. The wings 1 being rocked downward, the milk may be poured into another receptacle and the cream separating device removed from the receptacle 5 for cleansing.

In the case of the modified form shown in Fig. 3, the guide-rod 7 may be set vertically to bring the wings 1 into a position operative to cut off an average cream volume for a fixed quantity of milk. In this case, a fixed quantity of milk being placed in the receptacle in each instance, the device requires no further manipulation than the upward and downward rocking of the wings 1.

Having thus described my invention, my claims are as follows;

1. A device of the class described comprising a transverse axle; wings pivotally mounted upon the axle; a guide-rod terminally connected with the axle; means for rocking the wings, mounted upon the guide-rod.

2. A device of the class described comprising a transverse axle; wings, having a resilient outer edge, pivotally mounted upon the axle; a guide-rod terminally connected with the axle; means for rocking the wings, mounted upon the guide-rod.

3. A device of the class described comprising a transverse axle; wings pivotally mounted upon the axle; a resilient ring projecting laterally from the outer edge of the wings; a guide-rod terminally connected with the axle; means for rocking the wings, mounted upon the guide-rod.

4. A device of the class described comprising a transverse axle having one of its ends bent inward upon itself and flexed into a straight vertical arm; wings pivotally mounted upon the axle; means for rocking the wings.

5. In a device of the class described, a transverse axle; a guide-rod terminally connected with the transverse axle; wings pivotally mounted upon the axle; an operating-rod mounted upon the guide-rod, adapted to rock the wings.

6. In a device of the class described, a transverse axle; a guide-rod terminally connected with the transverse axle; wings pivotally mounted upon the axle; an operating-rod slidably mounted upon the guide-rod, adapted to rock the wings upon the axle.

7. In a device of the class described, a transverse axle; wings pivotally mounted upon the axle; a guide-rod terminally connected with the axle; an operating rod slidably mounted upon the guide-rod, means for connecting the operating-rod with the wings.

8. In a device of the class described, a transverse axle; wings pivotally mounted upon the axle; a guide-rod terminally connected with the axle; an operating-rod slidably mounted upon the guide-rod; inflexible members pivotally connecting the lower end of the operating rod with the upper surface of the wings.

In testimony that I claim the foregoing as my own, I have hereto affixed my signature in the presence of two witnesses.

JOHN H. REED.

Witnesses:
 C. A. CRITCHLOW,
 S. H. TAYLOR.